United States Patent
Franzoni et al.

(10) Patent No.: US 6,531,229 B1
(45) Date of Patent: Mar. 11, 2003

(54) SILICON RESIN AQUEOUS EMULSION FOR DAMP-PROOFING BUILDING MATERIALS

(75) Inventors: Christine Franzoni, Brignais (FR); Michel Feder, Villeurbanne (FR); Sandrine Goubet, Lyons (FR); Laurent Rocher, Saint Romain en Gal (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/719,764

(22) PCT Filed: Jun. 15, 1999

(86) PCT No.: PCT/FR99/01428

§ 371 (c)(1),
(2), (4) Date: Feb. 28, 2001

(87) PCT Pub. No.: WO99/65972

PCT Pub. Date: Dec. 23, 1999

(30) Foreign Application Priority Data

Jun. 17, 1998 (FR) .............................................. 98 07637

(51) Int. Cl.$^7$ ............................................... B32B 25/20

(52) U.S. Cl. ........................ 428/447; 524/837; 524/284; 524/366; 524/86; 524/157; 516/53; 516/24; 528/34; 427/387; 52/741.4

(58) Field of Search ................................. 524/837, 284, 524/366, 86, 157; 516/53, 24; 528/34; 428/447; 427/387; 52/741.4

(56) References Cited

U.S. PATENT DOCUMENTS

| 4,525,502 A | 6/1985 | Traver .......................... 524/96 |
| 4,584,341 A | 4/1986 | Huebner ...................... 524/837 |
| 4,677,160 A * | 6/1987 | Kondo et al. |
| 5,684,085 A * | 11/1997 | Gee et al. |

FOREIGN PATENT DOCUMENTS

| EP | 0 606 671 | 7/1994 | ............... C08J/3/03 |
| WO | WO 97 47569 | 12/1997 | ........... C04B/41/49 |

* cited by examiner

Primary Examiner—Robert Dawson
Assistant Examiner—Kuo-Liang Peng

(57) ABSTRACT

The invention concerns an aqueous emulsion comprising (1) at least one resin comprising at least one unit T, of formula $M_a D_b T_c (O_{1/2} R)_e$ or $D_b T_c (O_{1/2} R)_e$, (2) a reaction product of (a) ammonia or polyfunctional aromatic or aliphatic amine, (2) a carboxylic acid or anhydride, and (3) a non-ionic, anionic, or amphoteric surfactant.

30 Claims, 2 Drawing Sheets

SILICON RESIN AQUEOUS EMULSION FOR DAMP-PROOFING BUILDING MATERIALS

This application is an application under 35 U.S.C. Section 371 of International Application Number PCT/FR99/01428 filed on Jun. 15, 1999.

BACKGROUND OF THE INVENTION

The present invention relates to water-repellent aqueous emulsions, in particular for dampproofing buildings and building materials such as stone, concrete, mortar, terracotta (bricks, tiles, etc.) and wood, as well as to a process for preparing the emulsion and to a dampproofing process.

Moisture is the cause of damage in buildings: cracks caused by frost, appearance of molds and lichens, loss of heat insulation, etc. For this reason, compositions intended for dampproofing building materials have been developed.

Water-repellent agents in aqueous phase are more difficult to prepare. The difficulties are especially in giving them an efficacy which is close to those in solvent phase and also sufficient stability over time.

Patent application WO 97/47569 proposes, for dampproofing materials such as wood, cellulosic materials, masonry and concrete, an aqueous emulsion comprising:
(1) at least one resin, comprising at least one unit T or Q, of average formula (I)

in which:

$M = R^1R^2R^3SiO_{1/2}$, $D = R^4R^5SiO_{2/2}$, $T = R^6SiO_{3/2}$ and $Q = SiO_{4/2}$;

$R^1$, $R^2$, $R^3$, $R^4$, $R^5$ and $R^6$ are alkyl radicals and R is a hydrogen atom or an alkyl radical;

the symbols a, b, c and d represent the ratio of the silicon atoms of type M, D, T and Q, respectively, relative to the total number of silicon atoms in the resin of average formula (I), and the symbol e represents the number of groups $\equiv Si(O_{1/2}R)$ relative to the total number of silicon atoms in the resin of average formula (I);

and (2) the product of reaction between:
(a) at least one polyfunctional aromatic or aliphatic amine containing from 2 to 25 carbon atoms;
(b) at least one carboxylic acid or anhydride containing from 3 to 22 atoms;
(c) at least one crosslinking agent which is a water-soluble metal.

BRIEF SUMMARY OF THE INVENTION

Now, the Applicant has developed novel compositions based on silicone resin and on the components (2a) and (2b) specified above, and also containing at least one nonionic, anionic and/or amphoteric surfactant. These novel compositions have water-repellent power that is at least equivalent to those of the prior art, or even water-repellent power that is superior to those of the prior art, depending on the materials applied.

One of the main objects of the invention is to develop aqueous emulsions that are more stable when applied on materials, which means that the silicone resin in the droplets of the emulsion is not released immediately on contact with the material, and thus no phenomenon of repulsion of the material with respect to the successive layers of the said emulsion applied is observed. In this respect, higher stability is particularly observed on application to materials whose surface is alkaline (e.g.: mortar, cement mortar).

Another object of the invention is to propose aqueous emulsions of improved applicability, i.e. reinforced wettability, which is reflected by a more homogeneous distribution.

Another object of the invention is to propose aqueous emulsions which have an increased speed of imbibition (or coefficient of capillarity), i.e. the active principles contained in the droplets of the emulsion penetrate more quickly and easily into the materials applied.

DETAILED DESCRIPTION OF THE INVENTION

Figure 1:
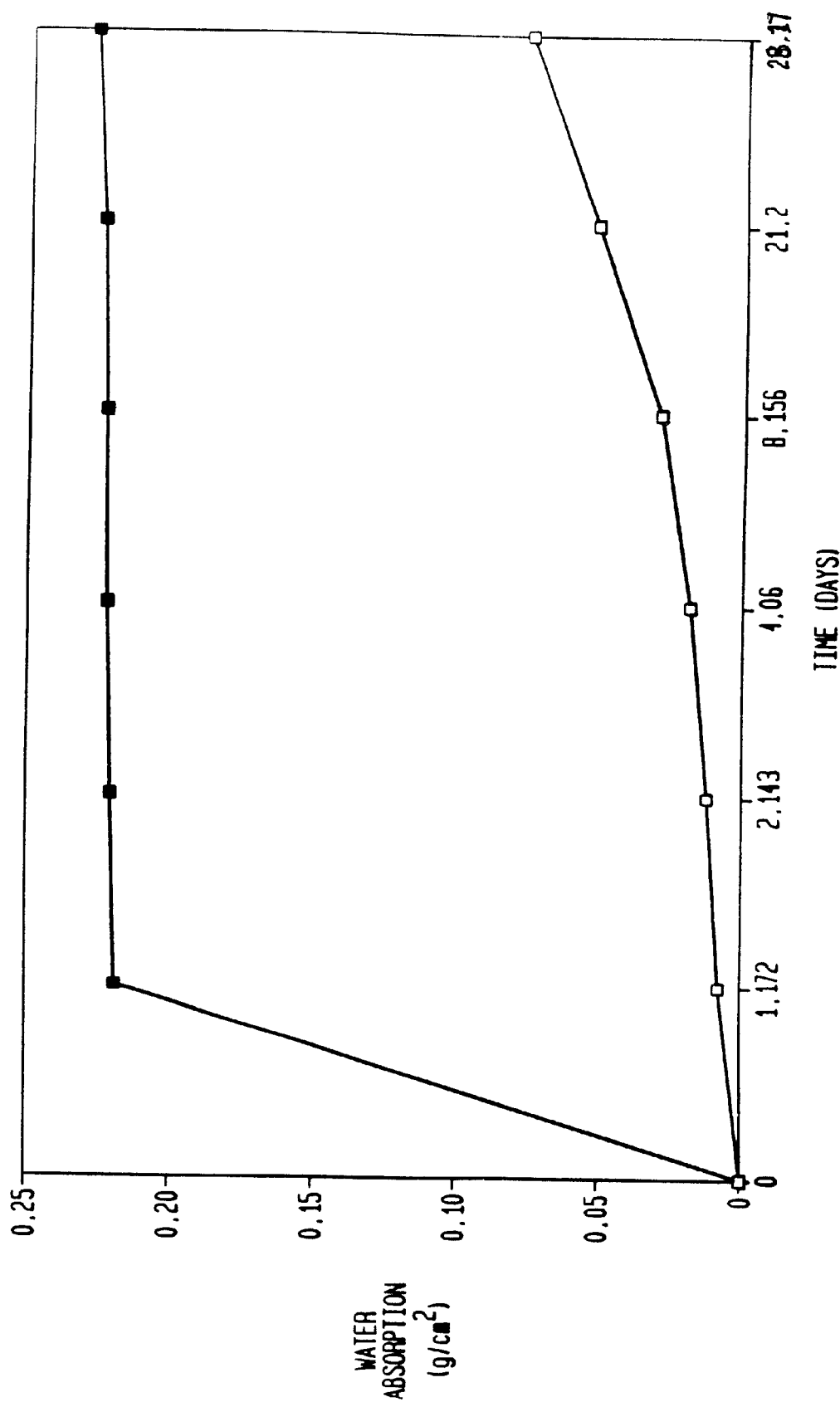
FIG. 1 is a graph show water-absorption with time of a mortar dampproofed with a composition according to the invention.

One subject of the present invention is thus an aqueous emulsion, optionally in the form of microemulsion, comprising:
(1) at least one resin, comprising at least one unit T or Q, of average formula (II):

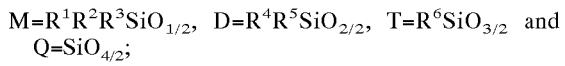

in which:

$M = R^1R^2R^3SiO_{1/2}$, $D = R^4R^5SiO_{2/2}$, $T = R^6SiO_{3/2}$ and $Q = SiO_{4/2}$;

$R^1$, $R^2$, $R^3$, $R^4$, $R^5$ and $R^6$, which may be identical or different, are alkyl, alkenyl, aminoalkyl, aryl, arylalkyl, alkylaryl or araryl radicals, R is a hydrogen atom or an alkyl radical;

the symbols a, b, c and d represent the ratio of silicon atoms of type M, D, T and Q, respectively, relative to the total number of silicon atoms in the resin of average formula (II);

and the symbol e represents the number of groups $\equiv Si(O_{1/2}R)$ relative to the total number of silicon atoms in the resin of average formula (II); these symbols varying in the following ranges:

$0 \leq a \leq 0.5$,
$0 \leq b \leq 0.95$,
$0 \leq c \leq 0.9$,
$0 \leq d \leq 0.8$,
$0.05 \leq e \leq 2$,
and $a+b+c+d=1$;

(2) the product of reaction between:
(2a) at least ammonia and/or a water-soluble polyfunctional aromatic and/or aliphatic amine containing from 2 to 25 carbon atoms;
(2b) at least one carboxylic acid or anhydride containing from 3 to 22 atoms;
(2c) optionally, at least one crosslinking agent which is a water-soluble metal.
(3) and at least one surfactant chosen from the following classes:
(a) nonionic surfactants chosen from:
(i) polyoxyalkylenated (polyethoxyethylenated, polyoxypropylenated or polyoxybutylenated) alkylphenols in which the alkyl substituent is $C_6$–$C_{12}$ and containing from 5 to 25 oxyalkylene units; examples which may be mentioned are Triton X-45, X-114, X-100 or X-102 sold by Rohm & Haas Co. and Igepal NP6 to NP17 from Rhodia Chimie;

(ii) polyoxyalkylenated $C_8$–$C_{22}$ aliphatic alcohols containing from 1 to 25 oxyalkylene (oxyethylene or oxypropylene) units; examples which may be mentioned are Tergitol 15-S-9 and Tergitol 24-L-6 NMW sold by Union Carbide Corp., Neodol 45-9, Neodol 23-65, Neodol 45-7 and Neodol 45-4 sold by Shell Chemical Co., Kyro EOB sold by Procter & Gamble Co., Synperonic A3 to A9 from ICI, Rhodasurf IT, DB, B and ROX from Rhodia Chimie and Genapol X 050 to X 150 from Hoechst;

(iii) alkoxylated terpenic hydrocarbons such as ethoxylated and/or propoxylated α- or β-pinenes containing from 1 to 30 oxyethylene and/or oxypropylene units;

(iv) the products resulting from the condensation of ethylene oxide or of propylene oxide with propylene glycol or ethylene glycol, having a weight-average molecular mass of about from 2 000 to 10 000, such as the Pluronic products sold by BASF;

(v) the products resulting from the condensation of ethylene oxide or of propylene oxide with ethylenediamine, such as the Tetronic products sold by BASF;

(vi) ethoxylated and/or propoxylated $C_8$–$C_{18}$ fatty acids containing from 5 to 25 ethoxylated and/or propoxylated units;

(vii) ethoxylated fatty amides containing from 5 to 30 units;

(viii) ethoxylated amines containing from 5 to 30 ethoxylated units;

(ix) alkoxylated amido amines containing from 1 to 50, preferably from 1 to 25 and most particularly from 2 to 20 oxyalkylene (preferably oxyethylene) units;

(x) ethoxylated tristyrylphenols such as Soprophor BSU and Soprophor S40 sold by Rhodia Chimie;

(b) anionic surfactants chosen from:

(i) alkyl ester sulfonates of formula R—CH($SO_3M$)—COOR', in which R represents a $C_8$–$C_{20}$, preferably $C_{10}$–$C_{16}$, alkyl radical, R' represents a $C_1$–$C_6$, preferably $C_1$–$C_3$, alkyl radical and M is an alkali metal (sodium, potassium or lithium) cation, a substituted or unsubstituted ammonium (methyl-, dimethyl-, trimethyl- or tetramethylammonium, dimethylpiperidinium, etc.) or an alkanolamine (monoethanolamine, diethanolamine, triethanolamine, etc.) derivative. Mention may be made most particularly of the methyl ester sulfonates whose radical R is $C_{14}$–$C_{16}$;

(ii) alkyl sulfates of formula $ROSO_3M$, in which R represents a $C_5$–$C_{24}$, preferably $C_{10}$–$C_{18}$, alkyl or hydroxyalkyl radical, M represents a hydrogen atom or has the same definition as in paragraph b(i), (iii) ethoxylenated (EO) and/or propoxylenated (PO) derivatives of the alkyl sulfates defined in paragraph b(ii), having on average from 0.5 to 30 and preferably from 0.5 to 10 EO and/or PO units;

(iv) alkylamide sulfates of formula $RCONHR'OSO_3M$ in which R represents a $C_2$–$C_{22}$, preferably $C_6$–$C_{20}$, alkyl radical, R' represents a $C_2$–$C_3$ alkyl radical, M representing a radical as defined in paragraph b(i) or a hydrogen atom;

(v) ethoxylenated (EO) and/or propoxylenated (PO) derivatives of the alkylamide sulfates defined in paragraph b(iv), having on average from 0.5 to 60 EO and/or PO units;

(vi) saturated or unsaturated $C_8$–$C_{24}$, preferably $C_{14}$–$C_{20}$, fatty acid salts, $C_9$–$C_{20}$ alkylbenzenesulfonates, primary or secondary $C_8$–$C_{22}$ alkylsulfonates, alkylglycerylsulfonates, the sulfonated polycarboxylic acids disclosed in GB-A-1 082 179, paraffinsulfonates, N-acyl N-alkyltaurates, alkyl phosphates, isethionates, alkyl succinamates, alkyl sulfosuccinates, sulfosuccinate monoesters or diesters, N-acyl sarcosinates, alkylglycoside sulfates, polyethoxycarboxylates; the cation being an alkali metal (sodium, potassium or lithium), a substituted or unsubstituted ammonium residue (methyl-, dimethyl-, trimethyl- or tetramethylammonium, dimethylpiperidinium, etc.) or an alkanolamine (monoethanolamine, diethanolamine, triethanolamine, etc.) derivative;

(c) amphoteric and zwitterionic surfactants chosen from:

(i) alkyldimethylbetaines, alkylamidopropyldimethylbetaines, alkyltrimethylsulfobetaines, the products of condensation of fatty acids and of protein hydrolysates, (ii) alkylamphoacetates or alkylamphodiacetates in which the alkyl group contains from 6 to 20 carbon atoms, (iii) phosphoaminolipids such as lecithin.

Examples of commercial products of surfactants of type (3)(b), mention will be made of the products Sipon LCS 95 or 98 from the company Sidobre Sinnova (sodium lauryl sulfate) and Nansa 1169A from the company Albright & Wilson (sodium dodecylbenzenesulfonate).

As examples of commercial products of surfactants (3)(c), mention will be made of the products Miranol C32 and Miranol C2M from Rhodia Chimie (cocoamphoacetate) and the products Alkateric 2CIB, CB, PB, CAB and LAB from Rhodia Chimie.

According to one preferred variant of the emulsion according to the invention, the surfactant (3) is chosen from those of the class of nonionic surfactants. More particularly in this case, very good results are obtained with a nonionic surfactant chosen from polyoxyalkylenated C8–C22 aliphatic alcohols containing from 1 to 25 oxyalkylene units; and preferably oxyethylene units and/or oxypropylene units.

According to another preferred variant of the emulsion according to the invention, it is developed without the use of a crosslinking agent. This mode of preparation is moreover particularly suitable when the surfactant (3) is nonionic.

In general, each of the radicals $R^1$ to $R^6$ in the resin may be a linear or branched alkyl radical, for example methyl, ethyl, propyl, butyl or isobutyl; an alkenyl radical such as, for example, vinyl; an aryl radical, for example phenyl or naphthyl; an arylalkyl radical such as, for example, benzyl or phenylethyl, an alkylaryl radical such as, for example, tolyl or xylyl; or an aralkyl radical such as biphenylyl.

The units M in the resin of formula (II), when there are several of them, may be identical to or different from each other; the same comment also applies to the units D and T. Similarly, the units ($O_{1/2}R$) may be identical to or different from each other.

According to one preferred embodiment of the invention, the resin is a copolymer of formula (II) in which:

$R^1$ to $R^6$, which may be identical or different, each represent a linear or branched $C_1$–$C_8$ alkyl radical;

R represents a hydrogen atom or a linear or branched $C_1$–$C_4$ alkyl radical; and the copolymer has in its structure at least one unit T combined with at least one of the units chosen from M and D.

As suitable resins corresponding to the preferred embodiment, mention will be made of the species A and B below:

╟ the species A represents the copolymers M D T $(O_{1/2}R)$ (IV) in which:
  according to a first definition, the species A1 is such that:
    $R^1$ to $R^6$ are identical or different $C_1$–$C_8$ alkyl radicals;
    R is a hydrogen atom or a $C_1$–$C_4$ alkyl radical;
    a is between 0.1 and 0.3;
    b is between 0.1 and 0.5;
    c is between 0.4 and 0.8;
    e is between 0.08 and 1.5;
      with a+b+c=1,
  according to a second more particular definition, the species A2 is such that:
    $R^1$ to $R^6$ are identical $C_1$–$C_3$ alkyl radicals;
    R is a hydrogen atom or a $C_1$–$C_4$ alkyl radical;
    a is between 0.1 and 0.3;
    b is between 0.1 and 0.5;
    c is between 0.4 and 0.8;
    e is between 0.08 and 1.5;
      with a+b+c=1.

╟ the species B represents the copolymers D T $(O_{1/2}R)$ (V) in which:
  according to a first definition, the species B1 is such that:
    $R^4$ to $R^6$, which may be identical or different, each represent a linear or branched $C_1$–$C_8$ alkyl radical;
    R is a hydrogen atom or a linear or branched $C_1$–$C_4$ alkyl radical;
    at least 25%, on a number basis, of one or more of the substituents $R^4$ to $R^6$ represent a linear or branched $C_3$–$C_8$ alkyl radical;
    b is between 0.2 and 0.9
    c is between 0.1 and 0.8
    e is between 0.2 and 1.5,
  according to a second more particular definition, the species B2 is such that:
    $R^4$ and $R^5$, which are identical, each represent a $C_1$–$C_2$ alkyl radical;
    $R^6$, which are identical, each represent a linear or branched $C_3$–$C_8$ and preferably $C_3$ alkyl radical;
    R is a hydrogen atom or, preferably, a linear $C_1$–$C_3$ alkyl;
    b is between 0.2 and 0.6
    c is between 0.4 and 0.8
    e is between 0.3 and 1.0.

In addition, the emulsion according to the invention can comprise at least one silane of formula $(R')_uSiX_{(4-u)}$ in which:
  R', which may be identical or different, are monovalent organic radicals, in particular linear or branched C1 to C20 alkyl or alkenyl, optionally substituted with a halogen group (F, Cl, Br, etc.), an epoxide group, an amine group, in particular methyl or vinyl, these groups R' preferably being a methyl, vinyl or octyl group;
  u is equal to 0, 1 or 2 and preferably 1 or 0;
  X, which may be identical or different, are condensable and/or hydrolyzable organic groups and represent:
    an OH group;
    an alkoxy or alkenyloxy group containing from 1 to 10 carbon atoms;
    an aryloxy group containing from 6 to 13 carbon atoms;
    an acyloxy group containing from 1 to 13 carbon atoms;
    a ketiminoxy group containing from 1 to 8 carbon atoms;
    an amino-functional or amido-functional group containing from 1 to 6 carbon atoms, linked to the silicon via an Si—N bond.

For a detailed description of the silanes, reference will be made in particular to the documents U.S. Pat. No. 3,294,725; U.S. Pat. No. 4,584,341; U.S. Pat. No. 4,618,642; U.S. Pat. No. 4,608,412; U.S. Pat. No. 4,525,565; EP-A-387 157; EP-A-340 120; EP-A-364 375; FR-A-1 248 826; and FR-A-1 023 477.

By way of example, mention may be made of the following alkoxysilanes: $Si(OC_2H_5)_4$; $CH_3Si(OCH_3)_3$; $CH_3Si(OC_2H_5)_3$; $(C_2H_5O)_3Si(OCH_3)$; $CH_2=CHSi(OCH_3)_3$; $CH_3(CH_2=CH)Si(OCH_3)_2$; $CH_2=CHSi(OC_2H_5)_3$; $CH_2=CHSi[ON=C(CH_3)C_2H_5]_3$; $CH_3Si[ON=C(CH_3)_2]_3$; $CH_3Si[—C(CH_3)=CH_2]_3$; methyltri(N-methylacetamidosilane); methyltris(cyclohexylaminosilane); $C_{10}H_{21}Si(OCH_3)_3$; $isoC_4H_9Si(OCH_3)_3$; $isoC_4H_9Si(OC_2H_5)_3$; $C_8H_{17}Si(OCH_3)_3$; $C_8H_{17}Si(OC_2H_5)_3$; $C_2H_5Si(OCH_3)_3$; $C_2H_5Si(OC_2H_5)_3$; $C_4H_9Si(OCH_3)_3$; $C_4H_9Si(OC_2H_5)_3$ and $(CH_3)_2Si(OCH_3)_2$.

When the substrate is neutral (from the point of view of the pH generated in the presence of water), for example stones, bricks, tiles or wood, a species A or B may be used, without preference. Moreover, the dampproofing performance qualities may be increased if need be, by adding a metallic curing compound to the emulsion. These compounds are essentially carboxylic acid salts, alkanolamine titanates and halides of metals chosen from lead, zinc, zirconium, titanium, iron, tin, calcium and manganese. Tin-based catalytic compounds, generally an organotin salt (for example tin bischelates or diorganotin dicarboxylates), are suitable in this respect.

When the building material is an alkaline substrate (from the point of view of the pH generated in the presence of water), i.e. a building material (for example mortars, concretes) obtained by mixing hydraulic binder, such as cement, inert material, water and optionally an adjuvant, a species B is advantageously used.

The amines (2a) are ammonia and/or primary, secondary or tertiary amines, which are optionally substituted, for example with one or more OH groups, or amines in the form of amides or amino acids.

In a particularly preferred manner, they are alcoholamines and in particular of amines containing alkyl group(s) containing from 1 to 5 carbon atoms and substituted with at least one OH, preferably from 1 to 3 OHs. Mention may be made in particular of:
  aminomethylpropanol, for example: 2-amino-2-methyl-1-propanol;
  aminoethylpropanediol, for example: 2-amino-2-ethyl-1,3-propanediol, preferred;
  triethanolamine.

They may also be diamines, such as hydrazine and hexamethylenediamine, cyclic amines such as morpholine and pyridine, aromatic and aliphatic amino acids such as 3-methyl-4-aminobenzoic acid, or amides or formula (VI):

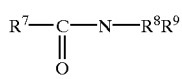

in which $R^7$, $R^8$ and $R^9$ can represent hydrogen or alkyl groups containing from 1 to 5 carbon atoms, such as formamide, acetamide, N-ethylacetamide and N,N-dimethylbutyramide.

The carboxylic acid (2b) is preferably a saturated or unsaturated, linear or branched, $C_3$–$C_{22}$, preferably $C_{10}$–$C_{18}$, fatty acid, which is optionally substituted, for example with an OH group, such as, in particular, oleic acid, isostearic acid, stearic acid, ricinoleic acid or tall oil fatty acid.

The crosslinking agents are used depending on the case. The preferred agents contain zinc, aluminum, titanium, copper, chromium, iron, zirconium and/or lead.

The crosslinking agents may be a salt or a complex of such a metal or of such metals. The salts may be acidic, basic or neutral. The appropriate salts include halides, hydroxides, carbonates, nitrates, nitrites, sulfates, phosphates, etc.

The crosslinking agents that are particularly preferred in the context of the present invention are zirconium complexes, for example those disclosed in patent application GB-A-1 002 103, which are salts of the zirconyl radical with at least two monocarboxylic acids, one acid group containing from 1 to 4 carbon atoms and the other containing more than 4 carbon atoms, and which may be prepared by a treatment at reflux of the carboxylic acid of 1 to 4 carbon atoms with a zirconyl carbonate paste, followed by addition of the carboxylic acid containing more than 4 carbon atoms. Water-soluble inorganic metal compounds may also be used. Zirconium ammonium carbonate is particularly preferred.

The emulsion preferably comprises from 10% to 60% by weight of resin of formula (II), the remainder generally being the reaction product (2), the surfactant (3) and water. The amount of surfactant (3) in the emulsion is between 0.1% and 15% by weight and preferably between 0.25% and 2% by weight relative to the total weight of the emulsion. The amount of reaction product (2) is between 0.1% and 15% by weight and preferably between 0.25% and 5% by weight relative to the total weight of the emulsion.

The reaction product (2) is preferably prepared by reacting the carboxylic acid (2a) and the amine (2b) in water, optionally hot water (25° C. to 75° C.). The compounds (2a) and (2b) are advantageously in equimolar amounts or amounts close to equimolarity, for example amounts which can range at least up to 1.2 mol of carboxylic acid, in particular stearic acid, per 1 mol of amine, in particular 2-amino-2-ethyl-1,3-propanediol. The metal, in particular zirconium, of the crosslinking agent is preferably introduced in the following amounts: the ratio between the number of moles of zirconium and the number of moles of the reaction product (2) is between 0 and 2, preferably between 0.05 and 1.

It is preferable to add water to the mixture of compounds (2a) and (2b).

The water and the compounds (2a) and (2b) are preferably heated to a temperature of 70 to 75° C., with gentle stirring.

When a crosslinking agent is used, compound (2c) is added with stirring subsequently, preferably after cooling to between 20 and 35° C.

The emulsion can be prepared in different ways, for example by phase inversion or by the direct method which consists in pouring the resin (1) into the mixture of surfactants (2) and (3) and water under shear.

In these two cases, the conventional techniques of batchwise emulsification are used, such as shearing mixers, or of continuous emulsification, such as a colloidal mill or a high-pressure homogenizer, for example a Manton Gaulin homogenizer.

The resin may, by choice, by emulsified with the amine carboxylate (2) or the surfactant (3) in a first step, followed by addition of the second surfactant (2) or (3) in the case in which the emulsion has already been made. The emulsion can also be prepared in the simultaneous presence of the two surfactants (2) and (3). It should be noted that, in the case in which the carboxylic acid used is solid, for example stearic acid, it should be melted during its addition in the preparation of the emulsion.

When a silane is also used in the water-repellent aqueous emulsion according to the invention, it is introduced in the same way as the resin during the preparation of the emulsion: i.e. the silane is introduced simultaneously, before or after the resin. In addition, it is possible to prepare a silane emulsion and a resin emulsion separately and then to mix them together before they are used as water-repellent product. In this case, the emulsion preferably comprises from 10% to 60% by weight of the mixture of resin of formula (II) and of the silane of formula $(R')_u SiX_{(4-u)}$, the remainder generally being the reaction product (2), the surfactant (3) and water. The amounts of the reaction product (2) and of surfactant (3) are as defined above.

The silane/resin weight ratio is between 0 and 20 and preferably between 0.1 and 9.

Another subject of the invention is the process for preparing an emulsion under the conditions described above.

The invention will now be described in greater detail with the aid of the examples and tests below.

Figure 2:
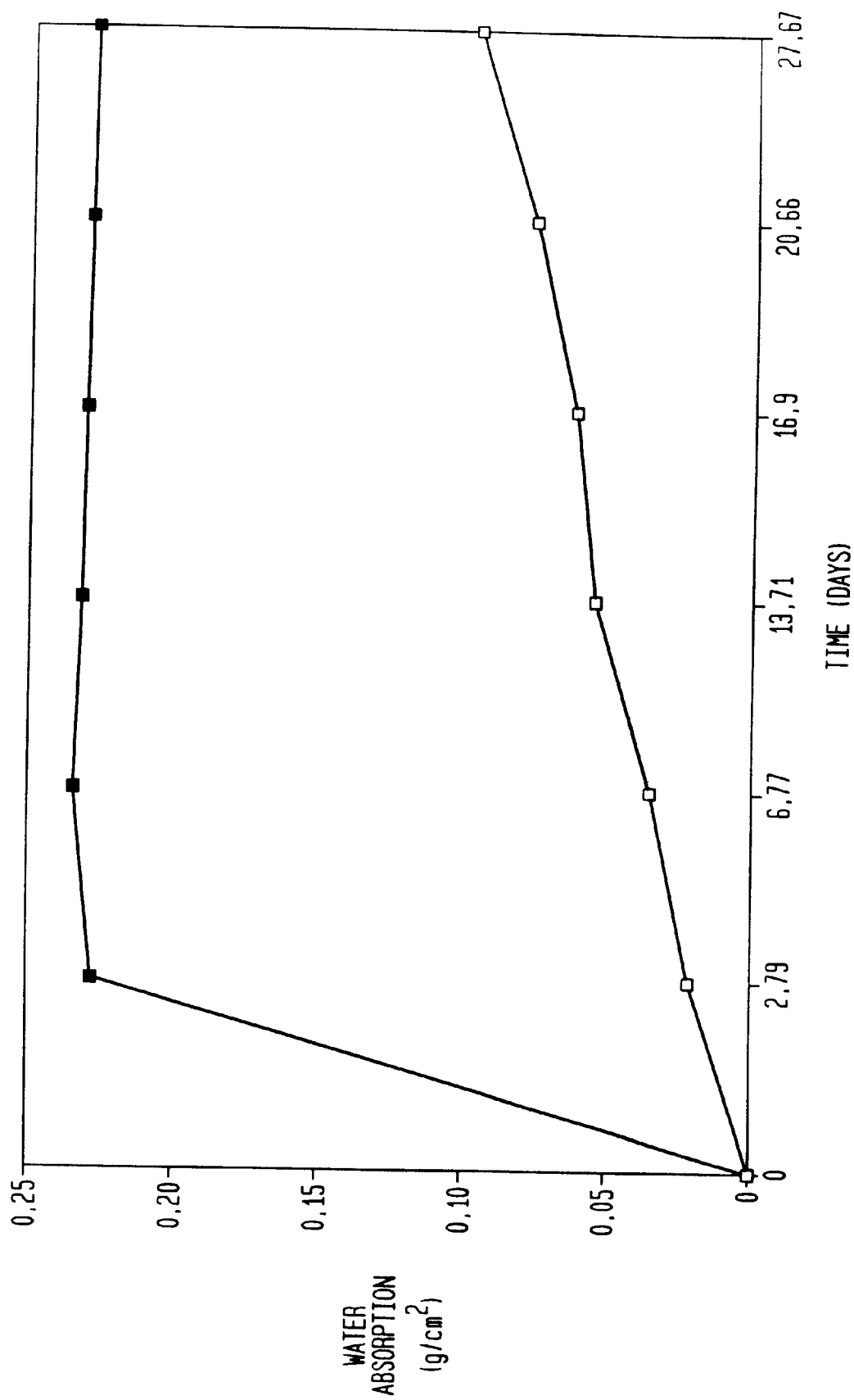
FIG. 2 is a graph show water-absorption with time of a mortar dampproofed with a composition according to the invention.

The graphs in FIGS. 1 and 2 show the results of damp-proofing the mortar whose composition is in accordance with CEN standard 196-1, with:

n=control, q=emulsions according to Example 3 for FIG. 1 and Example 4 for FIG. 2.

The time (d=days) is on the x-axis and the water absorption (g/cm$^2$) is on the y-axis.

EXAMPLES

I. Preparation of the Test Resin $DT_{(O_{1/2}R)}$ with $R=C_2H_5$

Reaction mode: cohydroethanolysis of chlorosilanes 3.5 mol of dimethyldichlorosilane and 3.5 mol of propyltrichlorosilane are loaded into a 2-liter reactor. The temperature is raised to 60° C. and an ethanol/water mixture (6.12 mol of ethanol/6.6 mol of water) is then added over 2 hours, with stirring and heating at 80° C. The acidic ethanol is then removed by distillation over 1 h 50 min at 120° C.

Next, the residual chlorine is removed by washing with 166 g of ethanol and 5.7 g of water (to adjust to the desired viscosity), followed by distillation over 1 h 5 min at 120° C. The mixture is cooled to 100° C. and neutralized with sodium bicarbonate (11.1 g) at 100° C. for 1 h. 515 g of resin are obtained after cooling to 50° C. and filtration.

The $^{29}$Si-NMR analysis reveals the distribution given below for the various units:

| Units | Mol % relative to the Si |
|---|---|
| D(O$_{1/2}$R) | 2.6 |
| D | 37.1 |
| T(O$_{1/2}$R)$_2$ | 5.8 |
| T(O$_{1/2}$R) | 23.9 |
| T | 30.6 |

Number of units Si(O$_{1/2}$R) per Si atom=0.381

Formula of the resin DT(O$_{1/2}$R):

$D_{0.397}T_{0.603}(O_{1/2}R)_{0.381}$ with $D=(CH_3)_2SiO_{2/2}$ and $T=C_3H_7SiO_{3/2}$

II. Preparation of the Emulsions

Emulsion 1: Emulsification of the resin DTOR of Example 1 with the product Rhodasurf ROX from the company Rhodia Chimie.

A. Composition of the Emulsion:

| | |
|---|---|
| Rhodasurf ROX (containing 85% active material) from the company Rhodia | 19.7 g |
| DTOR resin of Example I (visc. = 50 mm²/s) | 606 g |
| Demineralized water | 1313 g |
| Total mass | 1958.5 g |

The product Rhodasurf ROX is an ethoxylated isotridecyl alcohol comprising 8 ethoxy units.

B. Operating Conditions:

The Manton-Gaulin homogenizer is preheated with hot water (50° C.).

A pre-emulsion of the resin described in Example I is prepared in a 3-liter stainless-steel beaker by loading the product Rhodasurf ROX and the silicone resin.

The mixture is stirred with an impeller. The water is added dropwise with stirring (with the impeller) and under shear by means of a turbomixer (Ultra-Turrax) until the phases invert, i.e. until an oil-in-water emulsion is obtained (increase in viscosity and white color). The inversion takes place after 210 ml of water have been added. After stopping the addition of water, the mixture is stirred for about 10 min.

An emulsion with an average particle size of 2.43 µm (Coulter LS130) is obtained.

This emulsion is then homogenized once in the Manton-Gaulin homogenizer at a pressure of 400 bar.

The average particle size of the emulsion after homogenization in the Manton-Gaulin homogenizer and cooling is 0.896 µm.

The solids content of the final emulsion (measured by loss of weight of 2 g of emulsion at 120° C. for 1 hour) is 28.2%.

Emulsion 2: Emulsification of the resin DTOR with amino alcohol stearate (1%).

A. Composition:

| | |
|---|---|
| 2-Amino-2-ethyl-1,3-propanediol (= AEPD) | 6 g |
| Stearic acid | 14.05 g |
| DTOR resin described in Example I | 606 g |
| Water | 1319 g |
| Total mass | 1945.05 g |

B. Operating Conditions:

The Manton-Gaulin homogenizer is preheated with hot. water (50° C).

In parallel, a pre-emulsion is prepared in a 3-1 stainless-steel beaker by loading the AEPD, the stearic acid and the DTOR silicone resin described in Example I.

The mixture is mixed with an impeller, while heating on a water bath at 60° C. The water is added dropwise while stirring with the impeller and with a turbomixer (Ultra-Turrax) until the phases invert, i.e. until an oil-in-water emulsion is formed, which is reflected by an increase in viscosity and the appearance of a white color. This inversion takes place after adding 410 ml of water.

The introduction of water is then stopped and the mixture is stirred for about another 10 min. The remaining water is finally added.

An emulsion with an average particle size of 4.19 µm (characterized with a Coulter LS130 granulometer from the company Coultronics) is obtained.

This emulsion is then homogenized once in a Manton-Gaulin homogenizer at a pressure of 200 bar.

The average particle size of the emulsion after homogenization in the Manton-Gaulin homogenizer is 1.576 µm.

Emulsion 3: Emulsification of the DTOR resin with the amine stearate (1%) and Rhodasurf ROX (0.5%) [mixture of 2 surfactants: amine stearate (anionic) and Rhodasurf ROX (nonionic)]

A. Composition of the Emulsion:

| | |
|---|---|
| 2-Amino-2-ethyl-1,3-propanediol (= AEPD) | 6 g |
| Stearic acid | 14.05 g |
| Rhodasurf ROX (85%) from the company Rhodia | 11.44 g |
| DTOR resin (of viscosity = 50 mm²/s) | 606 g |
| Demineralized water | 1317.3 g |
| Total mass | 1954.8 g |

B. Operating Conditions:

The Manton-Gaulin machine is preheated with hot water (50° C.).

The pre-emulsion is prepared in a 3-1 stainless-steel beaker by loading the AEPD+the stearic acid+the ROX+the resin.

The mixture is mixed with an impeller and is simultaneously heated to 60° C. Water is then added dropwise, using a turbomixer until inversion has taken place (increase in viscosity and white color).

The inversion takes place after 210 ml of water have been added. After the addition, the mixture is stirred under shear for about 10 min.

The rest of the water is added. An emulsion with a particle size=1.945 µm is obtained. This emulsion is then homogenized in a Manton-Gaulin homogenizer at a pressure of 200 bar (only 1 homogenization).

Final average particle size: 0.684 µm.

Solids content (2 g at 120° C. for 1 hour)=29%.

Emulsion 4: Emulsification of a mixture of DTOR resin and of silane with the amine stearate (1%) and Rhodasurf ROX (1%) [mixture of 2 surfactants: amine stearate (anionic) and Rhodasurf ROX (nonionic)]

A. Composition of the Emulsion:

| | |
|---|---|
| 2-Amino-2-ethyl-1,3-propanediol (= AEPD) | 3.8 g |
| Stearic acid | 7.2 g |
| Rhodasurf ROX (85%) from the company Rhodia | 11.8 g |
| DTOR resin (of viscosity = 50 mm²/s) | 155.8 g |
| Silane | 155.8 g |
| Demineralized water | 666.4 g |
| Total mass | 1000 g |

The silane is octyltriethoxysilane of brand name Protectosil 800 E from the company Degussa.

B. Operating Conditions:

The Manton-Gaulin machine is preheated with hot water (50° C.).

The pre-emulsion is prepared in a 3-1 stainless-steel beaker by loading the AEPD, the stearic acid, the ROX, the resin and the silane.

The mixture is mixed with an impeller and is simultaneously heated to 60° C. Water is then added dropwise using a turbomixer until inversion has taken place (increase in viscosity and white color).

The inversion takes place after 235 ml of water have been added. After the addition, the mixture is stirred under shear for about 5 min.

The rest of the water is then added. An emulsion with a particle size equal to 0.95 μm is obtained.

This emulsion is then emulsified in a Manton-Gaulin homogenizer at a pressure of 450 bar. The final average particle size is 0.30 μm and the solids content (2 g at 120° C. for 1 hour) is 29.2%.

III. Tests for Evaluation of the Emulsions 1, 2, 3 and 4 on Mortar

A. Wettability

The wettability and thus the homogeneity of the treatment are assessed visually.

Good wettability of the emulsion is characterized in that the product spreads correctly and applies uniformly to the entire surface of the material, without dewetting, i.e. without any effect of shrinkage, when several successive coats are applied.

In addition, measurements of kinetic capillary imbibition were carried out in order to quantify the penetrability of the various emulsions.

Procedure:

Sprues of diameter 20 mm and H=25 mm are cut out of samples of mortar (composition according to CEN standard 196-1).

The base of the sample is placed in contact with the product to be evaluated (water or emulsion) and the kinetics of water uptake by weight are monitored for 1 hour.

The coefficient of capillarity C=M/St (rate of capillary rise) after 4 min of imbibition is calculated for each sample.

M is the mass of water absorbed after 4 min.
S is the surface area of the inner face of the sample.
T is the time in minutes.

| Emulsion | Silicone | Surfactant | Degree of dilution % | Coefficient of capillarity | Dewetting |
|---|---|---|---|---|---|
| 1 | Resin of Example I | ROX | 0.33 | 0.0080 | No |
| 2 | Resin of Example I | Amine stearate | 0.33 | 0.0046 | Yes |
| 3 | Resin of Example I | Amine stearate + ROX | 0.33 0.165 | 0.0069 | No |

Comments

Emulsion 1 achieves the fastest imbibition kinetics.

Emulsion 2 dewets on the support and a low rate of imbibition may be noted, reflected by a low coefficient of capillarity.

For emulsion 3, the amine stearate-ROX couple makes it possible to prevent the dewetting effect and to increase the coefficient of capillarity (a value close to that of emulsion 1 is obtained). The addition of ROX thus makes it possible to improve the stability of the emulsion, thereby slowing down the release of the resin and improving the wettability. The amount of ROX in emulsion 3 was optimized and is about 1% (1 g of surfactant per 100 g of emulsion).

B—Water-repellent performance qualities:

The water-repellent performance qualities are evaluated by assessing the pearling effect 24 hours after application, and by measuring the water uptake by capillarity during 28 days of immersion.

The pearling effect is achieved by depositing a drop of water on the surface of the treated support. The pearling effect is considered as positive when the drop does not spread, but instead remains as a pearl on the surface.

Procedure

The water-repellent emulsions 3 and 4 are deposited on standardized samples of mortar CEBTP with a surface area of 175 cm² (10×5×2.5 cm).

The treatment is carried out by totally immersing the samples in the water-repellent emulsion diluted to a concentration of 10% active material (see table below for the amount deposited).

The samples are then dried for 24 hours at ambient temperature and the pearling effect is determined.

The drying takes place over 14 days in a conditioned atmosphere at 70% RH and 25° C. (i.e. 15 days of drying in total).

The water uptake by capillarity is quantified by successive weighings of the samples immersed in water for 28 days. The results correspond to the average of 3 samples tested with each emulsion and these results are compared with the water uptake of an untreated support.

The water-repellent depth in the support (after breaking the sample) is then measured.

| Formulation | Concentration AM | Amount deposited (l/m²) | Decrease in water absorption (%) 28 d | Penetration (mm) |
|---|---|---|---|---|
| 3 | 10 | 0.15 +/− 0.02 | 67 | 0.5 |
| 4 | 10 | 0.11 | 58 | 0.5/1 |

Comments

The pearling effect is positive (visual observation) after drying for 24 hours.

The water-repellent properties of the treated support are good. Specifically, the decrease in water absorption after 28 days compared with an untreated support is about 67% for emulsion 3 and 58% for emulsion 4.

The water-repellent depth is from 0.5 to 1 mm in the supports treated with the two types of emulsion 3 and 4; this is standard for aqueous-phase products.

IV. Tests to Evaluate the Emulsions 2' and 2" on Mortar

Other surfactants replacing Rhodasurf ROX, which also improve the applicability of the silicone resin emulsion, were tested under the same conditions as above.

Emulsion 2 is supplemented with a second surfactant and the emulsion obtained is then diluted to 10%. It is then applied by brush onto a slab of mortar and the quality of the application is assessed visually.

Results

| Emulsion | Silicone | Surfactant | Degree of dilution % | Quality of the application |
|---|---|---|---|---|
| 2 | Resin of Example I | Amine stearate | 10 | Dewetting |
| 2' | Resin of Example I | Amine stearate + Sipon LCS 98 | 10 | No dewetting |
| 2" | Resin of Example I | Amine stearate + Miranol C 32 | 10 | No dewetting |

Comments

Emulsions 2' and 2" prevent the phenomenon of dewetting observed with emulsion 2 on a mortar support, and these emulsions thus improve the uniformity of the treatment.

The amount of surfactants Sipon and Miranol in emulsions 2' and 2" was optimized; this amount is about 1% (1 g of surfactant per 100 g of emulsion).

What is claimed is:

1. An aqueous emulsion comprising:
   (1) at least one resin, comprising at least one unit T, being:
      a A resin having the following formula (IV): $M_aD_bT_c(O_{1/2}R)_e$ (IV),
      wherein:
      $M=R^1R^2R^3SiO_{1/2}$, $D=R^4R^5SiO_{2/2}$, and $T=R^6SiO_{3/2}$, wherein $R^1$ to $R^6$, which are identical or different, are $C_1$–$C_8$ alkyl groups,
      R is a hydrogen atom or a $C_1$–$C_4$ alkyl group,
      a, b, and c represent the ratio of silicon atoms of type M, D and T, respectively, relative to the total number of silicon atoms in the resin of formula (IV), and
      e represents the number of groups $\equiv Si(O_{1/2}R)$ relative to the total number of silicon atoms in the resin of formula (IV),
      a is between 0.1 and 0.3,
      b is between 0.1 and 0.5,
      c is between 0.4 and 0.8,
      e is between 0.08 and 1.5, and
      a+b+c=1,
      or a B resin having the following formula (V): $D_bT_c(O_{1/2}R)_e$ (V),
      wherein:
      $D=R^4R^5SiO_{2/2}$, and $T=R^6SiO_{3/2}$, wherein $R^4$ to $R^6$, which are identical or different, are linear or branched $C_1$–$C_8$ alkyl groups,
      R is a hydrogen atom or a linear or branched $C_1$–$C_4$ alkyl group, at least 25%, on a number basis, of one or more of groups $R^4$ to $R^6$ are linear or branched $C_3$–$C_8$ alkyl groups,
      b, and c represent the ratio of silicon atoms of type D and T, respectively, relative to the total number of silicon atoms in the resin of formula (V), and
      e represents the number of groups $\equiv Si(O_{1/2}R)$ relative to the total number of silicon atoms in the resin of formula (V),
      b is between 0.2 and 0.9
      c is between 0.1 and 0.8
      e is between 0.2 and 1.5, and
      b+c=1,
   (2) a product of a reaction between:
      (2a) ammonia or a water-soluble polyfunctional aromatic or aliphatic amine containing from 2 to 25 carbon atoms,
      (2b) a carboxylic acid or anhydride containing from 3 to 22 atoms, and
      (2c) optionally, a crosslinking agent which is a water-soluble metal, and
   (3) at least one surfactant selected from the group consisting of the following surfactants (a), (b) and (c):
      (a) nonionic surfactants,
      (b) anionic surfactants, and
      (c) amphoteric and zwitterionic surfactants selected from the group consisting of the following surfactants (i) to (iii):
         (i) alkyldimethylbetaines, alkylamidopropyldimethylbetaines, alkyltrimethylsulfobetaines, or products of the condensation of fatty acids and of protein hydrolysates,
         (ii) alkylamphoacetates or alkylamphodiacetates wherein the alkyl group contains from 6 to 20 carbon atoms, and
         (iii) phosphoaminolipids.

2. The emulsion according to claim 1, wherein the nonionic surfactants (a) are selected from the group consisting of the following surfactants (i) to (x):
   (i) polyoxyalkylenated alkylphenols wherein the alkyl group is $C_6$–$C_{12}$ and containing from 5 to 25 oxyalkylene units,
   (ii) polyoxyalkylenated $C_8$–$C_{22}$ aliphatic alcohols containing from 1 to 25 oxyalkylene units,
   (iii) alkoxylated terpenic hydrocarbons, containing from 1 to 30 oxyethylene or oxypropylene units,
   (iv) products resulting from the condensation of ethylene oxide or of propylene oxide with propylene glycol or ethylene glycol, having a weight-average molecular mass of from 2000 to 10000,
   (v) products resulting from the condensation of ethylene oxide or of propylene oxide with ethylenediamine,
   (vi) ethoxylated and/or propoxylated $C_8$–$C_{18}$ fatty acids containing from 5 to 25 ethoxylated or propoxylated units,
   (vii) ethoxylated fatty amides containing from 5 to 30 ethoxylated units,
   (viii) ethoxylated amines containing from 5 to 30 ethoxylated units,
   (ix) alkoxylated amido amines containing from 1 to 50, oxyalkylene units, and
   (x) ethoxylated tristyrylphenols.

3. The emulsion according to claim 1, wherein the anionic surfactants (b) are selected from the group consisting of the following surfactants (i) to (vi):
   (i) alkyl ester sulfonates of formula $R^s$—CH($SO_3M$)—COOR$^{s'}$, wherein $R^s$ represents a $C_8$–$C_{20}$ alkyl group, $R^{s'}$ represents a $C_1$–$C_6$, alkyl group, and M is an alkali metal cation, a substituted or unsubstituted ammonium group, or an alkanolamine derivative,
   (ii) alkyl sulfates of formula $R^{s''}OSO_3M''$, wherein $R^{s''}$ represents a $C_5$–$C_{24}$ alkyl or hydroxyalkyl group, and M represents a hydrogen atom, an alkali metal cation, a substituted or unsubstituted ammonium group or an alkanolamine derivative, (iii) ethoxylenated and/or propoxylenated derivatives of an alkyl sulfate of formula $R^{s''}OSO_3M''$ as defined above, having on average from 0.5 to 30 ethoxylenated and/or propoxylenated units, (iv) alkylamide sulfates of formula $R^{s'''}CONHR^{s''''}OSO_3M''$ wherein $R^{s'''}$ represents a $C_2–C_{22}$ alkyl group, $R^{s''''}$ represents a $C_2–C_3$ alkyl group, and M" represents a hydrogen atom, an alkali metal cation, a substituted or unsubstituted ammonium group or an alkanolamine derivative, (v) ethoxylenated and/or propoxylenated derivatives of an alkylamide sulfates of formula $R^{s'''}CONHR^{s''''}OSO_3M''$ as defined-above, having on average from 0.5 to 60 ethoxylenated and/or propoxylenated units, and (vi) surfactants selected from the group consisting of saturated or unsaturated $C_8–C_{24}$ fatty acid salts, $C_9–C_{20}$ alkylbenzenesulfonates, primary or secondary $C_8–C_{22}$ alkylsulfonates, alkylglyceryl-sulfonates, paraffinsulfonates, N-acyl N-alkyltaurates, alkyl phosphates, isethionates, alkyl succinamates, alkyl sulfosuccinates, sulfosuccinate monoesters or diesters, N-acyl sarcosinates, alkylglycoside sulfates, and polyethoxycarboxylates, said surfactants comprising a cation being an alkali metal, a substituted or unsubstituted ammonium residue or an alkanolamine derivative.

4. The emulsion according to claim 2, wherein the surfactant is a nonionic surfactant selected the group consisting of from polyoxyalkylenated $C_8–C_{22}$ aliphatic alcohols containing from 1 to 25 oxyethylene units and/or oxypropylene units.

5. The emulsion according claim 1, wherein groups $R^1$ to $R^6$ are selected from the group consisting of methyl, ethyl, propyl, butyl, isobutyl, vinyl, phenyl, naphthyl, benzyl, phenylethyl, tolyl, xylyl and biphenylyl.

6. The emulsion according to claim 1, wherein the phosphoaminolipid is lecithin.

7. The emulsion according claim 1, wherein the resin is a A resin having formula (IV), wherein $R^1$ to $R_6$ are identical $C_3–C_3$ alkyl groups.

8. The emulsion according to claim 1, wherein the resin is a B resin having formula (V), wherein:

$R^4$ and $R^5$, are identical $C_1–C_2$ alkyl groups, $R^6$ is an identical, a linear $C_3$, alkyl group, R is a hydrogen atom or a linear $C_1–C_3$ alkyl group, b is between 0.2 and 0.6, c is between 0.4 and 0.8, and e is between 0.3 and 1.0.

9. The emulsion according to claim 1, further comprising at least one silane of the following formula:

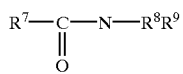

wherein:

R', which is identical or different, is a monovalent organic group, u is equal to 0, 1 or 2, and X, which is identical or different, is a condensable or hydrolyzable organic group, being:

an OH group, an alkoxy or alkenyloxy group containing from 1 to 10 carbon atoms, an aryloxy group containing from 6 to 13 carbon atoms, an acyloxy group containing from 1 to 13 carbon atoms, a ketiminoxy group containing from 1 to 8 carbon atoms, or an amino-functional or amido-functional group containing from 1 to 6 carbon atoms, linked to the silicon atom via an Si—N bond.

10. The emulsion according to claim 9, wherein:

R', which is identical or different, is a linear or branched $C_1$ to $C_{20}$ alkyl or alkenyl group, optionally substituted with a halogen atom, an epoxide group, or an amine group, and u is 1 or 0.

11. The emulsion according to claim 10, wherein R', which is identical or different, is a methyl, vinyl or octyl group.

12. The emulsion according to claim 1, wherein the water-soluble polyfunctional aromatic or aliphatic amine (2a) is a primary, secondary or tertiary amine, optionally substituted with one or more OH group, or an amine in the form of an amide or amino acid.

13. The emulsion according to claim 12, wherein the water-soluble polyfunctional aromatic or aliphatic amine (2a) is an alcoholamine.

14. The emulsion according to claim 13, wherein the amine (2a) comprises an alkyl group containing from 1 to 5 carbon atoms and substituted with at least one OH group.

15. The emulsion according to claim 14, wherein the the alkyl group is substituted with from 1 to 3 OH groups.

16. The emulsion according to claim 12, wherein the water-soluble polyfunctional aromatic or aliphatic amine (2a) is selected from the group consisting of diamines, cyclic amines, aromatic and aliphatic amino acids and amines in the form of amides having the following formula:

$$R^7-\underset{\underset{O}{\|}}{C}-N-R^8R^9$$

wherein $R^7$, $R^8$ and $R^9$ represent a hydrogen atom or an alkyl group containing from 1 to 5 carbon atoms.

17. The emulsion according to claim 16, wherein the water-soluble polyfunctional aromatic or aliphatic amine (2a) is selected from the group consisting of hydrazine, hexamethylenediamine, morpholine, pyridine, 3-methyl-4-aminobenzoic acid, formamide, acetamide, N-ethylacetamide and N,N-dimethylbutyramide.

18. The emulsion according to claim 1, wherein the carboxylic acid or anhydride (2b) is a saturated or unsaturated, linear or branched, $C_3–C_{22}$ fatty acid.

19. The emulsion according to claim 18, wherein preferably the carboxylic acid or anhydride (2b) is a saturated or unsaturated, linear or branched, $C_{10}–C_{18}$ fatty acid.

20. The emulsion according to claim 18, wherein the carboxylic acid or anhydride (2b) is selected from the group consisting of oleic acid, isostearic acid, stearic acid, ricinoleic acid and tall oil fatty acids.

21. The emulsion according claim 1, wherein:

the water-soluble polyfunctional aromatic or aliphatic amine (2a) is 2-amino-2-ethyl-1,3-propanediol, and the carboxylic acid or anhydride (2b) is stearic acid.

22. The emulsion according to claim 1, wherein the crosslinking agent (2c) is a zirconium complex.

23. The emulsion according to claim 22, wherein the zirconium complex is a zirconium ammonium carbonate.

24. The emulsion according to claim 1, further comprising a metallic curing compound.

25. A process for dampproofing a building material, comprising the step of applying to the material an emulsion as defined in claim 1.

26. The process according to claim 25, wherein the building material is an alkaline substrate obtained from a mixture of a hydraulic binder, an inert material, water and, optionally, an adjuvant.

27. The process according to claim 26, wherein the building material is mortar or concrete.

28. The process according to claim 27, wherein the resin in the emulsion as defined is claim 1 is a B resin as defined in claim 1.

29. A support treated with an aqueous emulsion as defined in claim 1.

30. The support according to claim 29, wherein the support is a surface of a building or a surface of a building material, selected from the group consisting of stone, concrete, mortar, terracotta and wood.

* * * * *